United States Patent Office 3,403,116
Patented Sept. 24, 1968

3,403,116
VINYLIDENE CHLORIDE - ETHYLENICALLY UN-SATURATED MONOMER-ETHYLENICALLY UN-SATURATED ACID - GELATIN EMULSION POLYMERIZED COATING COMPOSITION
Meyer Ream and William F. Fowler, Jr., Rochester, N.Y., assignors to Eastman Kodak Company, Rochester, N.Y., a corporation of New Jersey
No Drawing. Continuation-in-part of application Ser. No. 189,686, Apr. 24, 1962. This application Sept. 17, 1965, Ser. No. 492,977
6 Claims. (Cl. 260—8)

ABSTRACT OF THE DISCLOSURE

Compositions useful for subbing photographic film base are prepared by emulsion polymerization of vinylidene chloride in the presence of two other ethylenically unsaturated monomers and gelatin.

---

This application is a continuation-in-part of application Ser. No. 189,686 filed Apr. 24, 1962 now abandoned.

This invention relates to stable, substantially homogeneous aqueous coating compositions containing relatively large amounts of hydrophobic copolymers. More particularly, this invention relates to latices derived by the emulsion polymerization of certain hydrophobic monomers in the presence of gelatin.

Coating compositions suitable for use with the highly hydrophobic polyester supports for photographic film have been sought by the art for some time. In essence, the problem presented by such supports concerns the adhesion of hydrophilic emulsions to the hydrophobic polyester support. Desirable properties of the polyester supports such as inertness and dimensional stability make it advantageous to solve the problem of emulsion adhesion rather than avoiding it by using a less troublesome support.

Adhesion of emulsions to polyester supports has conventionally been provided by using two intermediate subbing layers. A subbing layer of hydrophobic polymers such as those described in Nadeau et al. U.S. Patent 2,943,937 has usually been applied directly upon the polyester support. However, though such subbing layers are more receptive to adhesion by hydrophobic compositions, sufficient emulsion adhesion is not provided solely by such an undercoating. Therefore, a second subbing layer comprising a gelating coating is applied over the first undercoating of hydrophobic copolymers when an emulsion is to be coated onto the prepared support.

Attempts have been made to combine the hydrophobic copolymer compositions with the hydrophilic gelatin layer by merely mixing the two together in an aqueous medium. However, a large proportion of such combined mixture must be of the hydrophobic copolymer composition and it has been very difficult to produce a stable mixture, that is, to preclude separation of the hydrophobic copolymer from the hydrophilic gelatin. When the mixture is rendered relatively stable by decreasing the hydrophobic copolymer, or by certain other means, acceptable adhesion to the polyester support has been elusive.

An object of this invention is to provide a novel composition containing hydrophobic copolymer and gelatin in a stable aqueous dispersion with the predominate portion of the solids being hydrophobic copolymer.

Another object of this invention is to provide a stable, substantially homogeneus latex which is adapted particularly for use in the preparation of coating compositions for polyethylene terephthalate film support.

Other objects of this invention will, in part, be obvious and will, in part, appear hereinafter.

For a complete understanding of the nature and the objects of this invention, reference is made to the following detailed description.

According to the instant invention, a stable latex is prepared by emulsion polymeriation of a mixture comprised of (A) from about 5 to 45 percent by weight of a monomer selected from the group consisting of acrylonitrile, methacrylonitrile and alkyl acrylates wherein the alkyl group contains 1 to 6 carbon atoms, (B) from about 50 to 90 percent by weight of a vinylidene chloride monomer, (C) from about 2 to 12 percent by weight of a monomer selected from the group consisting of acrylic acid, itaconic acid and monomethyl itaconate, a total of (A), (B) and (C) being 100 percent, and (D) from about 15 to 60 percent by weight of gelatin based upon the total weight of (A), (B) and (C).

It will be noted that the upper limit of the hydrophilic material, i.e. the gelatin, is 37.5 percent. Thus the latex is clearly predominantly hydrophobic with regard to solids though the above expression of the composition, which is more convenient for most purposes, may be somewhat misleading with regard to the amount of hydrophilic solids present.

The above-described composition concerns the generally operable range of the invention. However, it is to be understood that the change from a predominantly hydrophobic to predominantly hydrophilic solids composition progresses by degrees and the characteristics of the compositions also will change gradually rather than displaying a sharp change.

Preferred compositions of the instant invention are (A) from about 9 to 30 percent by weight of a monomer selected from the group consisting of acrylonitrile and methyl acrylate, (B) from about 60 to 90 percent by weight of vinylidene chloride monomer, (C) from about 2 to 10 percent by weight of acrylic acid, the total of (A), (B) and (C) being 100 percent, and (D) from about 20 to 30 percent by weight of gelatin based upon the total weight of (A), (B) and (C).

Polymerization is accomplished by charging the monomers and gelatin in an aqueous medium into a reaction chamber in the presence of a catalyst. The mixture is maintained at a temperature of preferably from 50° C. to 60° C. for a period of about 12 to 24 hours. It is preferable to stir the mixture during the period. Particularly suitable catalysts are the persulfates such as, for example, potassium persulfate, sodium persulfate, or ammonium persulfate. Persulfuric acid can also be employed if desired. Other catalysts such as those described in Illingsworth Patent No. 2,763,625 will be apparent to those skilled in the art. Amounts of catalyst varying from 0.25 to 1 percent by weight based upon the weight of monomers are generally operable.

Water is preferably used in amounts sufficient to provide a latex or dispersion after polymerization in which the solids content is from about 20 to 30 percent by weight of the aqueous dispersion. However, the amount of water is not critical.

It is of course desirable that the reaction be carried out in an inert atmosphere.

The following examples are illustrative of this invention. All parts are by weight unless otherwise indicated. Gelatin employed in the following examples is an especially pure grade of gelatin employed in the photographic art.

Example I 240 parts of distilled water, 18 parts of gelatin, 8.8 parts of methyl acrylate, 50 parts of vinylidene chloride, 12 parts of acrylic acid, and 0.30 part of potassium persulfate were placed in a reaction vessel and the reaction vessel was sealed. The reaction vessel was tumbled at about 15 revolutions per minute in a constant temperature bath maintained at about 60° C′ for a period of about 16 hours. An excellent aqueous resinous composition or latex was obtained which had a solids content of about 24 percent by weight.

Example II

In a manner similar to that described in Example I, the following ingredients were employed to provide an aqueous resinous composition having a solids content of about 21 percent.

| | Parts |
|---|---|
| Potassium persulfate | 0.30 |
| Distilled water | 240 |
| Gelatin | 18 |
| Methyl acrylate | 8.6 |
| Vinylidene chloride | 49 |
| Acrylic acid | 2.4 |

Example III

The following ingredients were employed to prepare an aqueous resinous composition, by the method of Example I, having a solids content of about 21 percent by weight.

| | Parts |
|---|---|
| Potassium persulfate | 0.30 |
| Distilled water | 240 |
| Gelatin | 18 |
| Methyl acrylate | 8.5 |
| Vinylidene chloride | 47.9 |
| Acrylic acid | 3.6 |

Example IV

The following ingredients were employed to prepare an aqueous resinous composition, by the method of Example I, having a solids content of about 23 percent by weight.

| | Parts |
|---|---|
| Potassium persulfate | 0.30 |
| Distilled water | 240 |
| Gelatin | 18 |
| Methyl acrylate | 8.3 |
| Vinylidene chloride | 46.9 |
| Acrylic acid | 4.8 |

Example V

The following ingretients were employed to prepare an aqueous resinous composition, by the method of Example 1, having a solids content of about 23 percent by weight.

| | Parts |
|---|---|
| Potassium persulfate | 0.30 |
| Distilled water | 240 |
| Gelatin | 18 |
| Methyl acrylate | 8.1 |
| Vinylidene chloride | 45.9 |
| Acrylic acid | 6.0 |

Example VI

The following ingredients were employed to prepare an aqueous resinous composition, by method of Example I, having a solids content of about 23 percent by weight.

| | Parts |
|---|---|
| Potassium persulfate | 0.30 |
| Distilled water | 240 |
| Gelatin | 12 |
| Methyl acrylate | 8.8 |
| Vinylidene chloride | 50 |
| Acrylic acid | 1.2 |

Example VII

Into a jacketed, glass-lined reaction vessel provided with a thermostat and a motor driven anchor-type agitator was placed 6 parts of potassium persulfate, 4800 parts of distilled water, and 360 parts of gelatin. After purging the mixture with nitrogen, 176 parts of methyl acrylate, 1000 parts of vinylidene chloride and 24 parts of acrylic acid were added to the reaction vessel and the vessel was sealed. The resulting mixture was heated to a temperature of about 60° C. for about 18 hours with constant stirring at approximately 100 r.p m. The maximum temperature obtained during the reaction was 61° C. and the maximum pressure about 18 p.s.i.g. A total of 6240 parts of high-quality aqueous resinous composition or resin latex was withdrawn from the reaction vessel and filtered through filter cloth. The resin latex contained about 23 percent solids.

Example VIII

An aqueous composition was prepared in the same manner as that described in Example VII with the exception that 162 parts of methyl acrylate, 918 parts of vinylidene chloride and 120 parts of acrylic acid were used. A total of 6270 parts of aqueous resinous composition was recovered which had a solids content of about 23 percent by weight. The aqueous resinous composition of this example was substantially homogeneous throughout and remained substantially stable for prolonged periods of time.

Example IX

Six parts of potassium persulfate, 4800 parts of distilled water, and 300 parts of gelatin were placed in a jacketed, glass-lined reaction vessel provided with a motor driven anchor-type agitator and a thermostat and the reaction vessel was purged with nitrogen. Subsequently, 173 parts of acrylonitrile, 979 parts of vinylidene chloride, and 48 parts of acrylic acid were added to the reaction vessel. The reaction vessel was then sealed and the mixture heated to about 60° C. for about 18 hours with agitation at 100 r.p.m. Residual pressure in the reaction vessel at the end of the polymerization was 7 p.s.i.g. at 22° C. 6180 parts of high-quality homogeneous and stable aqueous resinous composition was withdrawn from the reaction vessel and filtered through a cloth filter. Prior to filtering, the composition was heated to about 40° C. owing to the fact that the aqueous resinous composition gelled at room temperature. The aqueous resinous composition contained about 21 percent solids by weight.

Example X

An aqueous resinous composition was prepared in substantially the same manner as that described in Example IX with the exception that 169 parts of acrylonitrile, 959 parts of vinylidene chloride, and 72 parts of acrylic acid were employed. 6210 parts of aqueous resinous composition was recovered from the reaction vessel and had a solids content of about 23 percent by weight. Residual pressure in the reaction period was 3 p.s.i.g. at 22° C. This material gelled at room temperature, but became a coatable fluid when heated to about 40° C.

Example XI

An aqueous resinous composition was prepared in substantially the same manner as that described in Example IX with the exception that the monomer combination employed was comprised of 166 parts of acrylonitrile, 938 parts of vinylidene chloride, and 96 parts of acrylic acid. In this example about 6240 parts of aqueous resinous composition was recovered which had a solids content of 23 percent. Residual pressure in the reaction vessel, at the end of the reaction period, was about 7 p.s.i.g. at 40° C. This material was fluid at room temperature.

Example XII

An aqueous resinous composition was prepared in the same manner as that described in Example IX with the exception that the monomer combination employed was comprised of 162 parts of acrylonitrile, 918 parts of vinylidene chloride, and 120 parts of acrylic acide. 6210 parts of a highly stable, substantially homogeneous aqueous resinous composition was recovered from the reaction vessel and had a solids content of about 21.8 percent. The residual pressure in the reaction vessel, at the end of the reaction period, was about 5 p.s.i.g. at 40° C. This composition is liquid at room temperature.

Example XIII

An aqueous resinous composition was prepared in the same manner as that described in Example IX with the exception that the monomer combination employed was comprised of 166 grams of freshly distilled methacrylonitrile, 938 grams of vinylidene chloride and 96 grams of acrylic acid. A latex having 22.4 percent solids content was produced. The latex was found to be stable to freezing and suitable for use as a single coating photographic subbing on polyethylene terephthalate support.

Example XIV

An aqueous resinous composition was prepared in the same manner as that described in Example IX with the exception that the monomer combination employed was comprised of 331 grams of freshly distilled methacrylonitrile, 773 grams of vinylidene chloride and 96 grams of acrylic acid. The resulting latex had a solids content of 22.9 percent. The latex was useful as a photographic subbing and displayed substantially the same properties as that of Example XIII.

Example XV

An aqueous resinous composition was prepared in the same manner as that described in Example IX with the exception that the monomer combination employed was comprised of 497 grams of freshly distilled methacrylonitrile, 607 grams of vinylidene chloride and 96 grams of acrylic acid. The resulting latex displayed properties quite similar to those of Example XIV in that the solids content was 22.9 percent and the latex produced an excellent emulsion to polyethylene terephthalate bond when used as a single subbing layer upon the polyethylene terephthalate support.

The novel aqueous resinous compositions of this invention are substantially homogeneous dispersions of hydrophobic terpolymers in basically hydrophilic suspension medium. Surprisingly, such latices are highly stable for prolonged periods of time. The compositions can be appplied to surfaces of sheet material to provide thereon, after drying, a highly satisfactory homogeneous protection coating which is substantially hydrophobic though adherent to hydrophilic photographic emulsions.

Materials which can be protectively coated with the composition of this invention include paper products, wood products, articles made from metals and metal alloys, articles made from synthetic resins and particularly polyester materials such as polyethylene terephthalate articles.

The aqueous compositions of this invention have particular utility as coating compositions in the photographic art. In particular, they can be employed in the preparation of coating compositions for application to polyester supports such as fully oriented polyethylene terephthalate support members to provide thereon a sub layer highly adherent to photographic emulsions. It must be noted that sub layers of the composition of this invention are unusual in that they are adherent to hydrophobic polyester supports as well as to hydrophilic photographic emulsions.

The invention has been described in detail with particular reference to preferred embodiments thereof, but it will be understood that variations and modifications can be effected within the spirit and scope of the invention as described hereinabove and as defined in the appended claims.

We claim:

1. A composition consisting essentially of the emulsion polymerized mixture of (A) from about 5 to 45 percent by weight of a monomer selected from the group consisting of acrylonitrile, methacrylonitrile and alkyl acrylates wherein the alkyl group contains 1 to 6 carbon atoms, (B) from about 50 to 90 percent by weight of vinylidene chloride monomer, (C) from about 2 to 12 percent by weight of a monomer selected from the group consisting of acrylic acid, itaconic acid and monomethyl itaconate, the total of (A), (B) and (C) being 100 percent, and (D) from about 15 to 60 percent by weight of gelatin based upon the total weight of (A), (B) and (C).

2. A composition consisting essentially of the emulsion polymerized mixture of (A) from about 5 to 45 percent by weight of a monomer selected from the group consisting of acrylonitrile, methacrylonitrile and alkyl acrylates wherein the alkyl group contains 1 to 6 carbon atoms, (B) from about 50 to 90 percent by weight of vinylidene chloride monomer, (C) from about 2 to 12 percent by weight of acrylic acid, the total of (A), (B) and (C) being 100 percent, and (D) from about 15 to 60 percent by weight of gelatin based upon the total weight of (A), (B) and (C).

3. A composition consisting essentially of the emulsion polymerized mixture of (A) from about 9 to 30 percent by weight of a monomer selected from the group consisting of acrylonitrile and methyl acrylate, (B) from about 60 to 90 percent by weight of vinylidene chloride monomer, (C) from about 2 to 10 percent by weight of acrylic acid, the total of (A), (B) and (C) being 100 percent, and (D) from about 20 to 30 percent by weight of gelatin based upon the total weight of (A), (B) and (C).

4. An article of manufacture comprising a polyester film support having coated thereon the composition of claim 1.

5. An article as set forth in claim 4 wherein the polyester film support is polyethylene terephthalate.

6. An article of manufacture comprising a polyethylene terephthalate film support having coated directly thereon the composition of claim 3.

References Cited

UNITED STATES PATENTS

| | | | |
|---|---|---|---|
| 2,593,236 | 4/1952 | Young et al. | 260—8 |
| 2,748,027 | 5/1956 | Meier | 117—76 |
| 2,763,625 | 9/1956 | Illingsworth et al. | 260—8 |
| 2,852,386 | 9/1958 | Tong | 260—8 |
| 3,143,421 | 8/1964 | Nadeau et al. | 260—8 |
| 3,227,576 | 1/1966 | Stappen | 117—76 |

WILLIAM H. SHORT, *Primary Examiner.*

E. M. WOODBERRY, *Assistant Examiner.*